US012620701B2

(12) United States Patent
Lee et al.

(10) Patent No.: US 12,620,701 B2
(45) Date of Patent: May 5, 2026

(54) SWITCHING ANTENNA FOR AUTOMOTIVE UWB COMMUNICATION

(71) Applicants: HYUNDAI MOBIS CO., LTD., Seoul (KR); UIF (University Industry Foundation), Yonsei University, Seoul (KR)

(72) Inventors: Yoon Jin Lee, Yongin-si (KR); Young Joong Yoon, Seoul (KR); Seung Gook Cha, Seoul (KR)

(73) Assignees: Hyundai Mobis Co., Ltd., Seoul (KR); UIF (University Industry Foundation), Yonsei University, Seoul (KR)

( * ) Notice: Subject to any disclaimer, the term of this patent is extended or adjusted under 35 U.S.C. 154(b) by 272 days.

(21) Appl. No.: 18/240,964

(22) Filed: Aug. 31, 2023

(65) Prior Publication Data

US 2024/0079772 A1 Mar. 7, 2024

(30) Foreign Application Priority Data

Sep. 2, 2022 (KR) ........................ 10-2022-0111350

(51) Int. Cl.
*H01Q 3/24* (2006.01)
*H01Q 1/32* (2006.01)
*H01Q 5/25* (2015.01)

(52) U.S. Cl.
CPC ................. *H01Q 3/24* (2013.01); *H01Q 1/32* (2013.01); *H01Q 5/25* (2015.01)

(58) Field of Classification Search
CPC .. H01Q 3/24; H01Q 1/32; H01Q 5/25; H01Q 1/38; H01Q 1/3233; H01Q 3/247; H01Q 1/325
See application file for complete search history.

(56) References Cited

U.S. PATENT DOCUMENTS 6,600,901 B1 * 7/2003 Koehne .................... H01Q 3/24 455/25
10,616,904 B1 * 4/2020 Mirkamali ............. H01Q 21/10

FOREIGN PATENT DOCUMENTS

CN 109411886 A * 3/2019 ............... H01Q 1/38
EP 1481441 B1 * 6/2008 ........... H01Q 25/002
KR 10-2021-0039941 A 4/2021

* cited by examiner

*Primary Examiner* — Jack W Keith
*Assistant Examiner* — Clayton Paul Ridder
(74) *Attorney, Agent, or Firm* — Morgan, Lewis & Bockius LLP

(57) ABSTRACT

The present disclosure relates to a switching antenna for automotive Ultra-Wide-Band (UWB) communication. The switching antenna includes a substrate section, a radiating section having a plurality of radiators formed on the substrate section so as to be spaced apart from each other to provide a pattern signal, and a selective signaling section formed on the substrate section to selectively connect the radiating section to cause a radiation pattern of the radiating section to be one of directional and omnidirectional.

17 Claims, 4 Drawing Sheets

SWITCHING ANTENNA FOR AUTOMOTIVE UWB COMMUNICATION

CROSS-REFERENCE TO RELATED APPLICATION

This application claims priority from and the benefit of Korean Patent Application No. 10-2022-0111350, filed on Sep. 2, 2022, which is hereby incorporated by reference for all purposes as if set forth herein.

BACKGROUND

Field

Exemplary embodiments of the present disclosure relate to a switching antenna for automotive UWB communication, and more particularly, to a switching antenna for automotive UWB communication, in which a directional antenna and an omnidirectional antenna are selectively radiated to enable position localization or rear seat passenger detection.

Discussion of the Background

In general, an Ultra-Wide-Band (UWB) antenna is a short-range wireless communication antenna that can wirelessly connect with peripheral devices to transmit and receive data in a limited space such as an office, home, or vehicle.

UWB antennas are short-range wireless communication devices that realize ultra-high-speed communication with low energy while having a very wide frequency band compared to the frequency band of general antenna devices. UWB antennas can transmit data from hundreds of Mbps to several Gbps within a radius of 10 meters.

UWB antennas transmit signals by spreading the energy of the signal over a few GHz frequency band to prevent interference with other communication systems. UWB antennas can communicate in a largely frequency-agnostic manner without interfering with other narrowband signals. UWB antennas are immune to noise, have high data rates, and consume little power.

An antenna of a UWB module used for localization in a vehicle is omnidirectional, while an antenna of a UWB module that functions as a UWB radar to detect rear-seat passengers is directional.

However, due to the different characteristics of omnidirectional and directional antennas, a problem arises in that the antennas of the two UWB modules are currently manufactured and used separately. Therefore, it is necessary to improve this problem.

The background technology of the present disclosure is disclosed in Unexamined Korean Patent Publication No. 2021-0039941 (published on Apr. 21, 2021 and entitled 'Omnidirectional UWB Antenna Device').

SUMMARY

Various embodiments are directed to a switching antenna for automotive Ultra-Wide-Band (UWB) communication, in which a directional antenna and an omnidirectional antenna are selectively radiated to enable position localization or rear seat passenger detection.

In an embodiment, a switching antenna for automotive Ultra-Wide-Band (UWB) communication includes: a substrate section; a radiating section having a plurality of radiators formed on the substrate section so as to be spaced apart from each other to provide a pattern signal; and a selective signaling section formed on the substrate section to selectively connect the radiating section to cause a radiation pattern of the radiating section to be one of directional and omnidirectional.

The substrate section may include a substrate circuit part having an embedded circuit; and a substrate antenna part in which the radiating section and the selective signaling section are formed.

The radiating section may form a pattern on a top surface of the substrate antenna part.

The selective signaling section may be embedded in the substrate antenna part so as to be connected to and powered by the substrate circuit part.

The selective signaling section may be a pin diode embedded in the substrate section.

The radiating section may include: a first radiator connected to a lower portion of the selective signaling part; a second radiator selectively connected to both sides of the selective signaling section; and a third radiator selectively connected to an upper portion of the selective signaling section and spaced apart from the first and second radiators.

The first radiator may be connected to a center portion of the selective signaling section.

The first radiator may have a rectangular shape.

The second radiator may be connected to both ends of the selective signaling section.

The second radiator may have a triangular shape.

The selective signaling section may have a triangular vertex located at each of the both ends of the selective signaling section.

The third radiator may include: a first radiation pattern part selectively connected to the selective signaling section so as to be spaced apart from an upper portion of the second radiator; a second radiation pattern part extending from the first radiation pattern part and disposed on left and right edges of the substrate section so as to be spaced apart from the second radiator; and a third radiation pattern part extending from the second radiation pattern part and spaced apart from lower portions of the first radiator and the second radiator.

The selective signaling section may include: a first signaling part selectively connecting the first radiator and the second radiator; and a second signaling part selectively connecting the first radiator and the third radiator.

When the first signaling part connects the first radiator and the second radiator, and the second signaling part disconnects the first radiator and the third radiator, an omnidirectional radiation pattern may be formed.

When the first signaling part disconnects the first radiator and the second radiator, and the second signaling part connects the first radiator and the third radiator, a directional radiation pattern may be formed.

The selective signaling section may further include: a first signal pattern part connected to the first radiator and capable of being grounded; a second signal pattern part extending from the first signal pattern part to the left and right sides so as to be connected to the second radiator; and a third signal pattern part disposed above the first signal pattern part so as to be connected to the third radiator.

The second signal pattern part may be connected with the first signaling part, and the first and second radiators may be connected or disconnected depending on whether power is applied through the first signaling part.

The third signal pattern part may be connected with the second signaling part, and the first radiator and the third radiator may be connected or disconnected depending on whether power is applied through the second signaling part.

When a pair of the first signaling parts energize the second signal pattern part and the second signaling part de-energizes the third signal pattern part, the first radiator and the second radiator may be connected and the first radiator and the third radiator may be disconnected to provide an omnidirectional radiating signal.

When a pair of the first signaling parts de-energize the second signal pattern part and the second signaling part energizes the third signal pattern part, the first radiator and the second radiator may be disconnected and the first radiator and the third radiator may be connected to provide a directional radiating signal.

In the switching antenna for automotive UWB communication according to the present disclosure, the radiating section separately providing a plurality of pattern signals is selectively connected by the selective signaling section, thereby allowing a directional or omnidirectional radiation pattern to provide a directional or omnidirectional radiation signal.

DETAILED DESCRIPTION OF THE ILLUSTRATED EMBODIMENTS

Figure 1:
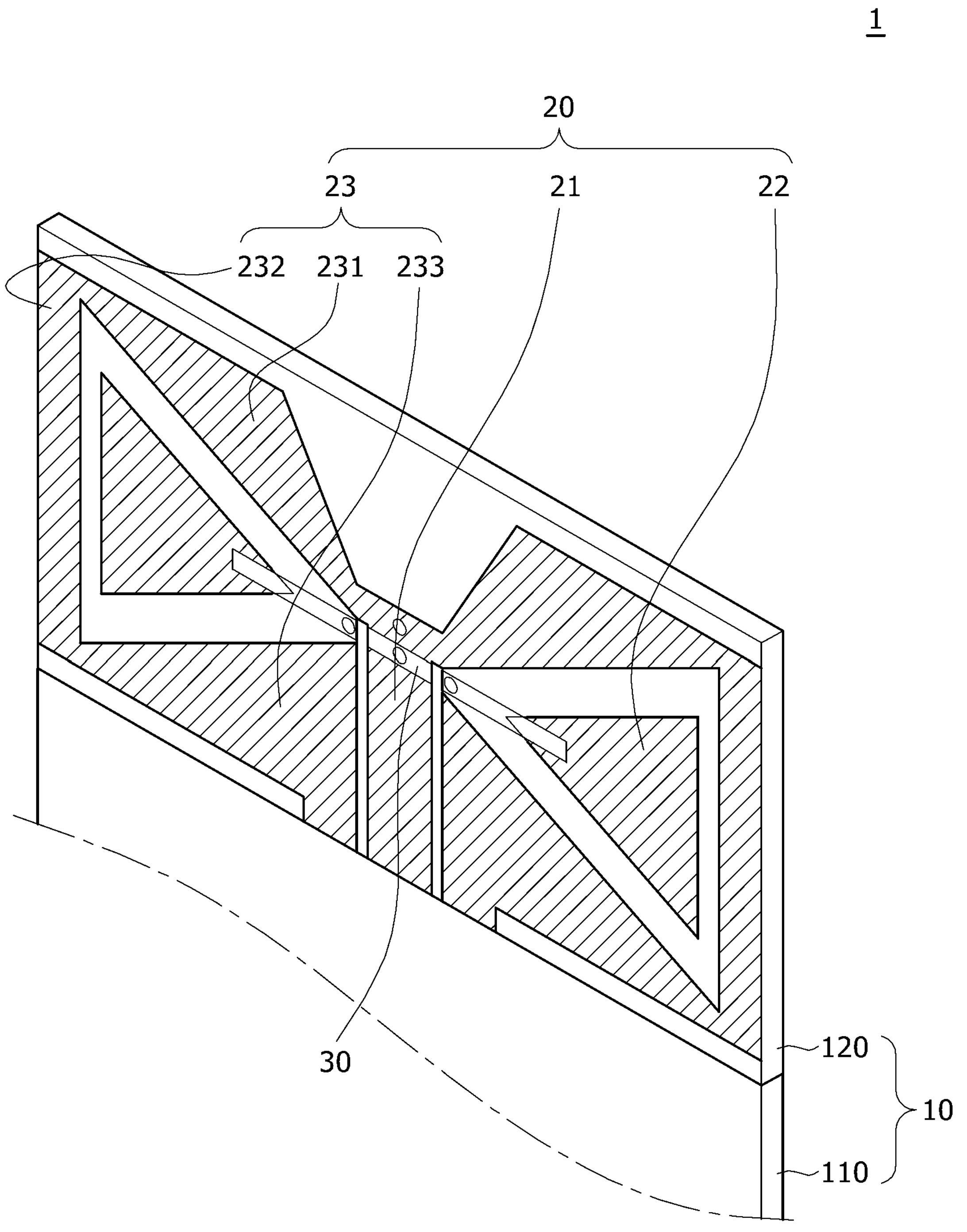
FIG. 1 is a diagram schematically illustrating a switching antenna for automotive Ultra-Wide-Band (UWB) communication according to one embodiment of the present disclosure.

Hereinafter, embodiments of a switching antenna for automotive Ultra-Wide-Band (UWB) communication according to the present disclosure will be described below with reference to the accompanying drawings. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

FIG. 1 is a diagram schematically illustrating a switching antenna for automotive UWB communication according to one embodiment of the present disclosure. Referring to FIG. 1, a switching antenna 1 for automotive UWB communication according to one embodiment of the present disclosure includes a substrate section 10, a radiating section 20, and a selective signaling section 30.

The substrate section 10 is made of a resin material, and a plane portion thereof may be partially divided into a substrate circuit part 110 having an embedded circuit, and a substrate antenna part 120 in which an antenna is formed.

That is, a directional radiation part 20, an omnidirectional radiation part 30, and a signaling part 40 may be formed in the substrate antenna part 120. The substrate section 10 may be formed through lamination of a plurality of layers bonded together, or may be formed through molding. In addition, a pattern antenna may be formed on one side of the substrate section 10, and a circuit may be formed on the other side of the substrate section 10.

The radiating section 20 may be provided with a plurality of radiators spaced apart from each other in the substrate section 10 so as to provide pattern signals. In one example, the radiating section 20 may form a pattern on a top surface of the substrate section 10. The radiating section 20 may be physically divided, or may be connected or disconnected by electrical signals.

The selective signaling section 30 may be formed on the substrate section 10 to selectively connect the radiating section 20. The plurality of radiators of the radiating section 20 may be electrically connected or disconnected by the selective signaling section 30 such that the radiation pattern may be either directional or omnidirectional. In one example, the selective signaling section 30 may be embedded in the substrate antenna part 120 and connected to and powered by the substrate circuit part 110. The selective signaling section 30 may be a pin diode embedded in the substrate section 10, wirings for controlling the pin diode may be disposed in the third and fourth layers of the substrate section 10, and via holes may be formed when wirings pass through other layers. In this case, the radiating section 20 may be formed on the top surface of the first layer of the substrate section 10.

The radiating section 20 according to one embodiment of the present disclosure may include a first radiator 21, a second radiator 22, and a third radiator 23.

The first radiator 21 may be coupled to a lower portion of the selective signaling section 30. In one example, the first radiator 21 may form a pattern on the substrate section 10. The first radiator 21 may be connected to and energized by the substrate circuit part 110.

More specifically, the first radiator 21 may have a rectangular shape so that the first radiator may be connected to a center portion of the selective signaling section 30. In one example, the selective signaling section 30 may be disposed at a center portion of the substrate section 10. The first radiator 21 may extend from a lower end of the substrate antenna part 120 to the center portion of the selective signaling section 30.

The second radiator 22 may be selectively connected to both sides of the selective signaling section 30. In one example, the second radiator 22 may be spaced apart from the first radiator 21 and the third radiator 23. In this case, the spaced apart portion may be an area in which a pattern is not formed on the surface of the substrate section 10.

More specifically, the second radiator 22 may have a triangular shape so that the second radiator may be connected to both ends of the selective signaling section 30. For example, the second radiator 22 may have a triangular shape with vertices respectively located at both ends of the selective signaling section 30. The second radiator 22 may be connected with the selective signaling section 30 and have a symmetrical bow-tie shape.

The third radiator 23 is selectively connected to the top of the selective signaling section 30 and may be spaced apart from the first and second radiators 21 and 22. In one example, the third radiator 23 may include a first radiation pattern part 231 that is selectively connected to the selective signaling section 30, formed across the top surface of the substrate section 10, and spaced apart from the top of the second radiator 22, a second radiation pattern part 232 that extends from the first radiation pattern part 231 and is formed on both left and right edges of the top surface of the substrate section 10 so as to be spaced apart from the lateral portion of the second radiator 22, and a third radiation pattern part 233 that extends from the second radiation pattern part 232 so as to be spaced apart from the lateral portion of the first radiator 21 and the lower portion of the second radiator 22.

Figure 2:
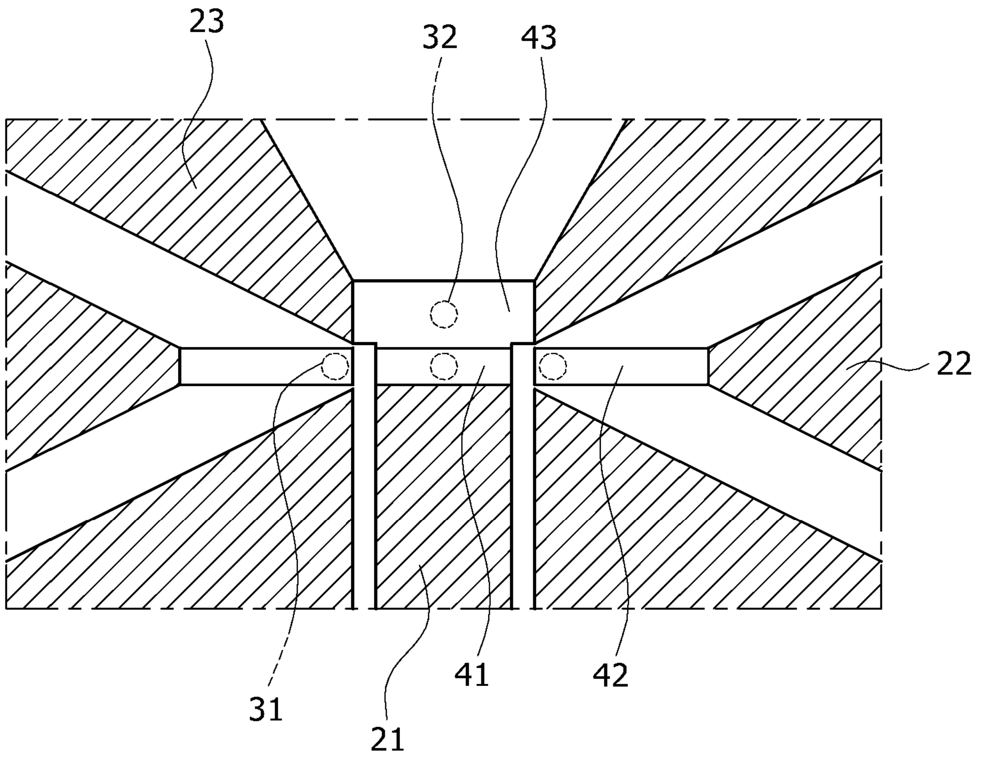
FIG. 2 is a diagram schematically illustrating a selective signaling section in the switching antenna for automotive UWB communication according to one embodiment of the present disclosure.

FIG. 2 is a diagram schematically illustrating a selective signaling section in the switching antenna for automotive UWB communication according to one embodiment of the present disclosure. Referring to FIG. 2, the selective signaling section 30 according to one embodiment of the present disclosure may include a first signaling part 31 and a second signaling part 32.

The first signaling part 31 may selectively connect the first radiator 21 and the second radiator 22, and the second signaling part 32 may selectively connect the first radiator 21 and the third radiator 23.

In one example, the first signal pattern part 41 is connected with the first radiator 21, and a pin diode for grounding may be connected to the first signal pattern part 41. The second signal pattern part 42 extends to both the left and right sides of the first signal pattern part 41, and the first signal pattern part 41 and the second radiator 22 may be connected by the second signal pattern part 42. The second signal pattern part 42 is connected with the first signaling part 31, and the first radiator 21 and the second radiator 22 may be connected or disconnected depending on whether power is applied through the first signaling part 31. The third signal pattern part 43 is disposed on top of the first signal pattern part 41 so as to be connected with the third radiator 23. The third signal pattern part 43 is connected with the second signaling part 32, and the first radiator 21 and the third radiator 23 may be connected or disconnected depending on whether power is applied through the second signaling part 32.

Figure 3:
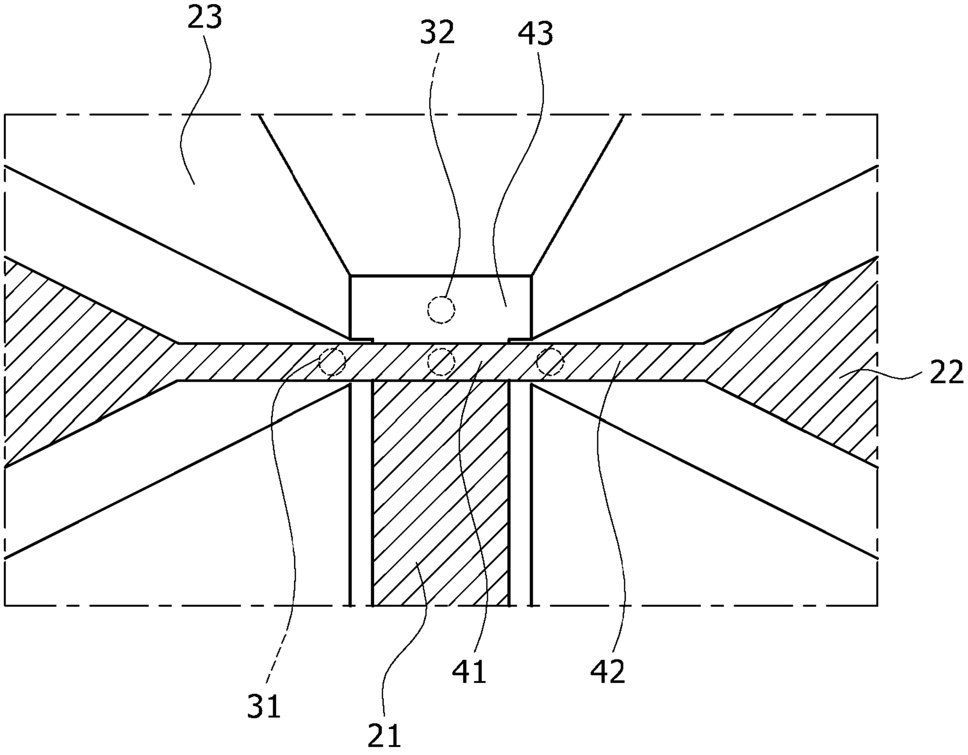
FIG. 3 is a diagram schematically illustrating a state in which an omnidirectional radiation pattern is formed in the switching antenna for automotive UWB communication according to one embodiment of the present disclosure.

FIG. 3 is a diagram schematically illustrating a state in which an omnidirectional radiation pattern is formed in the switching antenna for automotive UWB communication according to one embodiment of the present disclosure. Referring to FIG. 3, the first signaling part 31 connects the first radiator 21 and the second radiator 22, and the second signaling part 32 disconnects the first radiator 21 and the third radiator 23. This may result in an omnidirectional radiation pattern.

In one example, when a pair of first signaling parts 31 energize the second signal pattern part 42, the first radiator 21 and the second radiator 22 may be connected to each other by the second signal pattern part 42. At this time, when the second signaling part 32 de-energizes the third signal pattern part 43, the first radiator 21 and the third radiator 23 are disconnected from each other. This allows the first signal pattern part 41, the second signal pattern part 42, and the second radiator 22 to form a monopole shape and provide an omnidirectional radiation signal.

Figure 4:
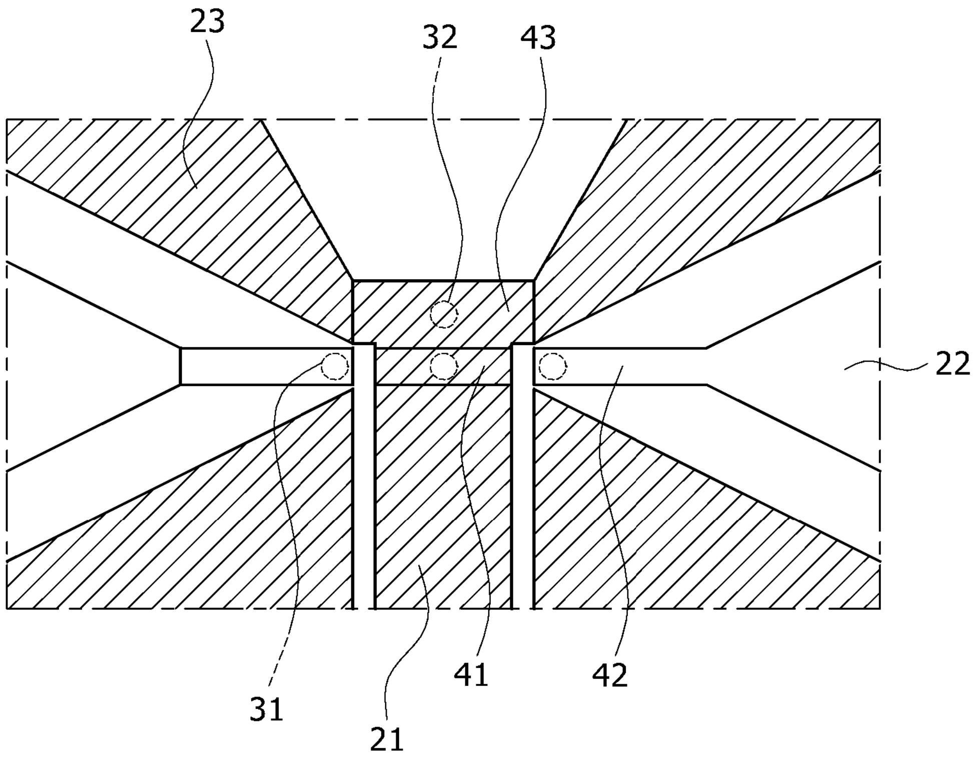
FIG. 4 is a diagram schematically illustrating a state in which a directional radiation pattern is formed in the switching antenna for automotive UWB communication according to one embodiment of the present disclosure.

FIG. 4 is a diagram schematically illustrating a state in which a directional radiation pattern is formed in the switching antenna for automotive UWB communication according to one embodiment of the present disclosure. Referring to FIG. 4, the first signaling part 31 may disconnect the first radiator 21 and the second radiator 22, and the second signaling part 32 may connect the first radiator 21 and the third radiator 23. This may result in a directional radiation pattern.

In one example, when a pair of first signaling parts 31 de-energize the second signal pattern part 42, the first radiator 21 and the second radiator 22 are disconnected from each other. Then, when the second signaling part 32 energizes the third signal pattern part 43, the first radiator 21 and the third radiator 23 are connected to each other. This enables the third radiator 23 to provide a directional radiation signal.

The operation of the switching antenna 1 for automotive UWB communication having the above structure will be described as follows.

The selective signaling section 30 is formed at the center portion of the substrate section 10, the first radiator 21 is connected to the center portion of the selective signaling section 30, the second radiator 22 is connected to both sides of the selective signaling section 30, and the third radiator 23 is connected to the upper portion of the selective signaling section 30. The third radiator 23 is spaced apart from the second radiator 22 so that the third radiator wraps around the second radiator 22.

When detection of a rear-seat occupant is required in the above conditions, the pair of first signaling parts 31 de-energize the second signal pattern part 42, and the second signaling part 32 energizes the third signal pattern part 43. As a result, the first radiator 21 and the second radiator 22 are disconnected from each other, and the first radiator 21 and the third radiator 23 are connected to each other. Thus, the third radiator 23 may detect whether a rear-seat occupant is present by radiating a directional radiation signal.

On the other hand, when position localization is required, the pair of first signaling parts 31 energize the second signal pattern part 42, and the second signaling part 32 de-energizes the third signal pattern part 43. As a result, the first radiator 21 and the second radiator 22 are connected to each other by the second signal pattern part 42, and the first radiator 21 and the third radiator 23 are disconnected from each other. Thus, the first signal pattern part 41, the second signal pattern part 42, and the second radiator 22 are shaped like a monopole and radiate omnidirectional radiation signals, which enables the position localization.

In the switching antenna 1 for automotive UWB communication according to the present disclosure, the radiating section 20 separately providing a plurality of pattern signals is selectively connected by the selective signaling section 30, thereby allowing a directional or omnidirectional radiation pattern to provide a directional or omnidirectional radiation signal.

While the present disclosure has been described with reference to the embodiments depicted in the drawings, the embodiments are for illustrative purposes only, and those skilled in the art to which the present technology pertains will understand that various modifications of the embodiments and any other embodiments equivalent thereto are available. Accordingly, the true technical protection scope of the present disclosure should be determined by the appended claims.

What is claimed is:

1. A switching antenna for automotive Ultra-Wide-Band (UWB) communication, the switching antenna comprising:

a substrate section;

a radiating section having a plurality of radiators disposed on the substrate section so as to be spaced apart from each other to provide a pattern signal; and a selective signaling section disposed on the substrate section to selectively connect the radiating section to cause a radiation pattern of the radiating section to be directional or omnidirectional, wherein on a plan view of the substrate section, the radiating section comprises:
a first radiator connected to a lower portion of the selective signaling section;
second radiators disposed on opposing sides of the selective signaling section to selectively connected to the opposing sides of the selective signaling section; and
a third radiator selectively connected to an upper portion of the selective signaling section, surrounding the second radiators, and spaced apart from the first and second radiators, and
wherein on the plan view, the lower portion and the upper portion of the selective signaling section are arranged in a first direction, and the opposing sides of the selective signaling section are arranged in a second direction crossing the first direction.

2. The switching antenna for automotive UWB communication according to claim 1, wherein the substrate section comprises:
a substrate circuit part having an embedded circuit; and
a substrate antenna part in which the radiating section and the selective signaling section are disposed.

3. The switching antenna for automotive UWB communication according to claim 2, wherein the radiating section has a pattern on a top surface of the substrate antenna part.

4. The switching antenna for automotive UWB communication according to claim 2, wherein the selective signaling section is embedded in the substrate antenna part so as to be connected to and powered by the substrate circuit part.

5. The switching antenna for automotive UWB communication according to claim 2, wherein the selective signaling section is a pin diode embedded in the substrate section.

6. The switching antenna for automotive UWB communication according to claim 1, wherein the first radiator is connected to a center portion of the selective signaling section.

7. The switching antenna for automotive UWB communication according to claim 1, wherein the first radiator has a rectangular shape.

8. The switching antenna for automotive UWB communication according to claim 1, wherein the second radiators are connected to opposing ends of the selective signaling section in the second direction.

9. The switching antenna for automotive UWB communication according to claim 8, wherein each of the second radiators has a triangular shape.

10. The switching antenna for automotive UWB communication according to claim 9, wherein the selective signaling section includes one portion extending in the first direction and another portion extending from a central portion of the one portion in the second direction.

11. The switching antenna for automotive UWB communication according to claim 1, wherein the third radiator comprises:
a first radiation pattern part selectively connected to the selective signaling section so as to be spaced apart from an upper portion of each of the second radiators;
second radiation pattern parts respectively extending from the first radiation pattern part and respectively disposed on left and right edges of the substrate section so as to be spaced apart from the second radiators; and
third radiation pattern parts respectively extending from the second radiation pattern parts towards the first radiator and spaced apart from the first radiator and lower portions of the second radiators.

12. The switching antenna for automotive UWB communication according to claim 1, wherein the selective signaling section comprises:
first signaling parts configured to connect the second radiators to the first radiator or disconnect the second radiator from the first radiator depending on whether power is applied through the first signaling parts; and
a second signaling part configured to connect the third radiator to the first radiator or disconnect the third radiator from the first radiator depending on whether power is applied through the second signaling part.

13. The switching antenna for automotive UWB communication according to claim 12, wherein an omnidirectional radiation pattern is formed by connecting the first radiator and the second radiators to each other through the first signaling parts, and by disconnecting the first radiator and the third radiator from each other by the second signaling part.

14. The switching antenna for automotive UWB communication according to claim 12, wherein a directional radiation pattern is formed by disconnecting the first radiator and the second radiators from each other by the first signaling parts, and by connecting the first radiator and the third to each other through the second signaling part.

15. The switching antenna for automotive UWB communication according to claim 12, wherein the selective signaling section further comprises:
a first signal pattern part connected to the first radiator and capable of being grounded;
second signal pattern parts respectively extending from the first signal pattern part to left and right sides of the first signal pattern part so as to be respectively connected to the second radiators; and
a third signal pattern part disposed above the first signal pattern part so as to be connected to the third radiator.

16. The switching antenna for automotive UWB communication according to claim 15, wherein the first radiator and the second radiators are connected and the first radiator and the third radiator are disconnected to provide an omnidirectional radiating signal, by energizing the second signal pattern parts through the first signaling parts, and by de-energizing the third signal pattern part through the second signaling part.

17. The switching antenna for automotive UWB communication according to claim 15, wherein the first radiator and the second radiators are disconnected and the first radiator and the third radiator are connected to provide a directional radiating signal, by de-energizing the second signal pattern parts through the first signaling parts, and by energizing the third signal pattern part through the second signaling part.

* * * * *